United States Patent
Zhang et al.

(10) Patent No.: US 11,910,338 B2
(45) Date of Patent: *Feb. 20, 2024

(54) METHODS AND APPARATUSES FOR TRANSMITTING AND RECEIVING SYNCHRONIZATION SIGNAL, AND TRANSMISSION SYSTEM

(71) Applicant: ZTE Corporation, Guangdong (CN)

(72) Inventors: Junfeng Zhang, Guangdong (CN); Peng Hao, Guangdong (CN); Zhaohua Lu, Guangdong (CN); Wei Gou, Guangdong (CN); Xing Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,637

(22) Filed: Aug. 23, 2021

(65) Prior Publication Data

US 2021/0385770 A1    Dec. 9, 2021

Related U.S. Application Data

(63) Continuation of application No. 16/252,539, filed on Jan. 18, 2019, now Pat. No. 11,102,737, which is a
(Continued)

(30) Foreign Application Priority Data

Jul. 18, 2016  (CN) .......................... 201610567463.5

(51) Int. Cl.
*H04W 56/00* (2009.01)
*H04B 17/318* (2015.01)
*H04L 27/26* (2006.01)

(52) U.S. Cl.
CPC ........ *H04W 56/001* (2013.01); *H04B 17/318* (2015.01); *H04L 27/26* (2013.01)

(58) Field of Classification Search
CPC .... H04B 17/318; H04L 27/26; H04W 56/001; H04W 56/0015
See application file for complete search history.

(56) References Cited

U.S. PATENT DOCUMENTS 8,265,006 B2 * 9/2012 Ahmadi .............. H04L 27/2613
                                                         370/328
9,867,189 B2 * 1/2018 Lee ....................... H04L 5/0091
(Continued)

FOREIGN PATENT DOCUMENTS

CN    101465830    6/2009
CN    101588337    11/2009
(Continued)

OTHER PUBLICATIONS

3GPP, "Technical Specification Group Radio Access Network; Evolved Universal Terristrial Radio Access (E-UTRA); Physical channels and modulation (Release 12)," 3GPP TS 36.211 v12.3.0, 124 pages, Sep. 2014.
(Continued)

*Primary Examiner* — Dung B Huynh
(74) *Attorney, Agent, or Firm* — Perkins Coie LLP

(57) ABSTRACT

Embodiments of the disclosure provide methods and apparatuses for transmitting and receiving a synchronization signal, and a transmission system. A method includes that, a base station determines one or more sets of system parameters, each set of the system parameters including at least one of the following information of a carrier: frequency information, or a frame structure parameter; the base station constructs a synchronization signal of a predetermined structure according to the system parameters; and the base station transmits the synchronization signal to the terminal; the one
(Continued)

or more sets of system parameters corresponding to the same predetermined structure. With the embodiments of the disclosure, the problem of excessive complexity in detection of the synchronization signal in the related technology is solved.

20 Claims, 5 Drawing Sheets

Related U.S. Application Data continuation of application No. PCT/CN2017/093393, filed on Jul. 18, 2017.

(56) References Cited

U.S. PATENT DOCUMENTS

| | | | | |
|---|---|---|---|---|
| 10,405,300 | B2* | 9/2019 | Au | H04L 5/0053 |
| 10,912,080 | B2* | 2/2021 | Wang | H04L 27/2626 |
| 11,102,737 | B2* | 8/2021 | Zhang | H04W 56/001 |
| 2006/0034379 | A1* | 2/2006 | Yang | H04L 27/2675 375/365 |
| 2007/0253367 | A1* | 11/2007 | Dang | H04W 72/30 370/329 |
| 2008/0039133 | A1* | 2/2008 | Ma | H04L 27/2626 455/418 |
| 2010/0222062 | A1* | 9/2010 | Chou | H04W 16/14 455/449 |
| 2010/0239044 | A1* | 9/2010 | Ringstrom | H04B 15/02 455/63.1 |
| 2010/0296429 | A1* | 11/2010 | Han | H04L 27/2655 370/312 |
| 2011/0075760 | A1* | 3/2011 | Ogawa | H04J 13/0055 375/296 |
| 2011/0141941 | A1* | 6/2011 | Lee | H04L 5/0053 370/252 |
| 2013/0121223 | A1* | 5/2013 | Sugitani | H04W 52/0274 370/311 |
| 2013/0136071 | A1* | 5/2013 | Han | H04L 5/0053 370/329 |
| 2014/0086168 | A1 | 3/2014 | Bao et al. | |
| 2014/0099113 | A1* | 4/2014 | Fang | H04Q 11/0071 398/66 |
| 2014/0161056 | A1* | 6/2014 | Moulsley | H04B 7/024 370/329 |
| 2014/0198675 | A1 | 7/2014 | He et al. | |
| 2015/0016337 | A1 | 1/2015 | Chung et al. | |
| 2015/0049716 | A1* | 2/2015 | Gutierrez | H04B 7/0617 370/329 |
| 2015/0055616 | A1* | 2/2015 | Kim | H04L 27/2605 370/330 |
| 2015/0263839 | A1 | 9/2015 | He et al. | |
| 2015/0282178 | A1* | 10/2015 | Kim | H04L 27/2602 370/329 |
| 2015/0358983 | A1* | 12/2015 | Frenger | H04L 1/0006 370/329 |
| 2016/0044584 | A1* | 2/2016 | Jung | H04W 48/14 370/330 |
| 2016/0127098 | A1* | 5/2016 | Ng | H04L 5/001 370/329 |
| 2016/0156492 | A1* | 6/2016 | Martinez | H04L 27/2666 375/340 |
| 2016/0294521 | A1* | 10/2016 | Au | H04L 27/264 |
| 2016/0352551 | A1* | 12/2016 | Zhang | H04L 5/0007 |
| 2016/0353476 | A1* | 12/2016 | Sartori | H04L 5/0064 |
| 2017/0005848 | A1* | 1/2017 | Zheng | H04W 56/001 370/329 |
| 2017/0006578 | A1* | 1/2017 | Rico Alvarino | H04L 5/0048 |
| 2017/0094547 | A1* | 3/2017 | Yum | H04W 56/001 |
| 2017/0111780 | A1* | 4/2017 | Rico Alvarino | H04W 40/12 |
| 2017/0111930 | A1* | 4/2017 | Rajagopal | H04B 7/0626 |
| 2017/0126348 | A1* | 5/2017 | Pourahmadi | H04J 13/0062 |
| 2017/0156140 | A1* | 6/2017 | Islam | H04L 5/0044 |
| 2017/0164350 | A1* | 6/2017 | Sun | H04L 5/0007 |
| 2017/0201968 | A1* | 7/2017 | Nam | H04B 7/0632 |
| 2017/0214559 | A1* | 7/2017 | Berardinelli | H04L 27/2602 |
| 2017/0230979 | A1* | 8/2017 | Saxena | H04L 5/0044 |
| 2017/0244535 | A1* | 8/2017 | Islam | H04W 72/1263 |
| 2017/0245165 | A1* | 8/2017 | Onggosanusi | H04W 24/08 |
| 2017/0257860 | A1* | 9/2017 | Nam | H04L 5/0053 |
| 2017/0290089 | A1* | 10/2017 | Kato | H04L 27/0008 |
| 2017/0295110 | A1* | 10/2017 | Kato | H04L 5/0007 |
| 2017/0311276 | A1* | 10/2017 | Tsai | H04B 7/0695 |
| 2017/0318598 | A1* | 11/2017 | Islam | H04L 5/0044 |
| 2017/0325250 | A1* | 11/2017 | Manolakos | H04W 72/1205 |
| 2017/0332359 | A1* | 11/2017 | Tsai | H04L 5/0053 |
| 2017/0353254 | A1* | 12/2017 | Islam | H04L 5/0023 |
| 2017/0353912 | A1* | 12/2017 | Einhaus | H04L 5/0094 |
| 2017/0366311 | A1* | 12/2017 | Iyer | H04L 5/0007 |
| 2017/0367120 | A1* | 12/2017 | Murray | H04L 5/0023 |
| 2018/0007673 | A1* | 1/2018 | Fwu | H04W 4/70 |
| 2018/0041949 | A1* | 2/2018 | Liu | H04B 7/0695 |
| 2018/0054786 | A1* | 2/2018 | Yamada | H04W 24/10 |
| 2018/0084462 | A1* | 3/2018 | Xu | H04W 36/0005 |
| 2018/0110031 | A1* | 4/2018 | Yoshizawa | H04W 72/14 |
| 2018/0146465 | A1 | 5/2018 | Li et al. | |
| 2018/0199341 | A1* | 7/2018 | Baldemair | H04L 27/0008 |
| 2018/0220444 | A1* | 8/2018 | Lee | H04W 72/0453 |
| 2018/0234971 | A1* | 8/2018 | Kato | H04W 72/0446 |
| 2018/0241508 | A1* | 8/2018 | Chervyakov | H04W 4/40 |
| 2018/0242264 | A1* | 8/2018 | Pelletier | H04W 52/325 |
| 2018/0242317 | A1* | 8/2018 | Marinier | H04L 1/1819 |
| 2018/0249441 | A1* | 8/2018 | Ryoo | H04W 68/02 |
| 2018/0270093 | A1* | 9/2018 | Lopez | H04L 5/0037 |
| 2018/0270803 | A1* | 9/2018 | Kwak | H04W 56/00 |
| 2018/0332610 | A1* | 11/2018 | Xia | H04W 72/1268 |
| 2019/0007152 | A1* | 1/2019 | Yi | H04L 5/0028 |
| 2019/0029003 | A1 | 1/2019 | Takeda et al. | |
| 2019/0075003 | A1* | 3/2019 | Wang | H04L 27/2607 |
| 2019/0075006 | A1* | 3/2019 | Yi | H04W 72/0446 |
| 2019/0089498 | A1* | 3/2019 | Pelletier | H04L 5/003 |
| 2019/0089502 | A1* | 3/2019 | Yi | H04W 72/0453 |
| 2019/0090284 | A1* | 3/2019 | Kang | H04L 5/0044 |
| 2019/0103931 | A1* | 4/2019 | Yi | H04B 7/2656 |
| 2019/0109695 | A1* | 4/2019 | Kim | H04L 27/2613 |
| 2019/0116007 | A1* | 4/2019 | Yi | H04L 27/2607 |
| 2019/0123864 | A1* | 4/2019 | Zhang | H04B 7/088 |
| 2019/0141578 | A1* | 5/2019 | Tang | H04W 48/10 |
| 2019/0150132 | A1* | 5/2019 | Bala | H04L 27/0008 370/329 |
| 2019/0150135 | A1* | 5/2019 | Lee | H04L 5/00 370/312 |
| 2019/0159178 | A1* | 5/2019 | Tang | H04L 27/2602 |
| 2019/0159230 | A1* | 5/2019 | Kim | H04L 5/0053 |
| 2019/0230696 | A1* | 7/2019 | Kim | H04L 5/00 |
| 2019/0239066 | A1* | 8/2019 | Yi | H04L 1/0026 |
| 2020/0169375 | A1* | 5/2020 | Yi | H04L 27/26025 |
| 2020/0314908 | A1* | 10/2020 | Hwang | H04W 74/0833 |
| 2020/0336249 | A1* | 10/2020 | Yi | H04W 72/1263 |
| 2021/0235479 | A1* | 7/2021 | Tang | H04L 27/2666 |

FOREIGN PATENT DOCUMENTS

| | | |
|---|---|---|
| CN | 101588337 A | 11/2009 |
| CN | 101822013 A | 9/2010 |
| CN | 104053170 A | 9/2014 |
| CN | 104349464 A | 2/2015 |
| CN | 104769865 A | 7/2015 |
| CN | 104812052 A | 7/2015 |
| CN | 105122729 | 12/2015 |
| CN | 105357162 A | 2/2016 |
| CN | 106161318 A | 11/2016 |
| CN | 107079464 A | 8/2017 |
| CN | 107634924 B | 8/2020 |
| JP | 2016-006548 | 1/2016 |
| WO | 2017/004774 | 1/2017 |

OTHER PUBLICATIONS

Chinese Office Action dated Aug. 28, 2019 for Chinese Patent Application No. 201610567463.5, filed on Jul. 18, 2017 (10 pages).

(56) References Cited

OTHER PUBLICATIONS

Chinese Office Action dated Mar. 5, 2021 for Chinese Patent Application No. 202010801655.4, filed on Jul. 18, 2016 (16 pages).
Extended Search Report dated Mar. 9, 2020 for European Application No. 17830465.5, filed on Jul. 18, 2017 (9 pages).
Huawei, et al. "Way forward on the mapping of SS blocks with 30kHz SCS" 3GPP TSG RAN WG1 Meeting NR-adhoc#2 Qingdao, China, R1-1711939, Jun. 27-30, 2017, 3 pages.
International Search Report and Written Opinion dated Oct. 20, 2017 for International Application No. PCT/CN2017/093393, filed on Jul. 18, 2017 (14 pages).
LG Electronics, et al. "WF on SS Burst set Composition" 3GPP TSG RAN WG1 Meeting RAN1 Adhoc Qingdao, China Jun. 27-30, 2017, R1-1711854, 5 pages.
Nokia, et al. "SS Block Composition, SS Burst Set Composition and SS Time Index Indication" 3GPP TSG-RAN WG1 Meeting #88bis Spokane, WA, USA Apr. 3-7, 2017, R1-1705837, 1 page.
Nokia, "Way forward on the mapping of SS block" 3GPP TSG RAN WG1 Meeting NR-adhoc#2 Qingdao, China Jun. 27-30, 2017, R1-1711899, 10 pages.
Pierre Lescuyer, et al., "Chapter 3: Physical Layer of E-UTRAN," Evolved Packet System (EPS)—The LTE and SAE Evolution of 3G UMTS, John Wiley & Sons, Ltd, pp. 75-170, Jan. 11, 2008.
Co-Pending EP Patent Application No. 22209092.0 Extended European Search Report dated Mar. 13, 2023, 9 pages.
Lescuyer et al. "Physical Layer of E-UTRAN in Evolved Packet System (EPS)—The LTE and SAE Evolution of 3G UMTS", Jan. 11, 2008 (Jan. 11, 2008), John Wiley & Sons, Ltd, Chichester, West Sussex, England, 96 pages.
Co-Pending EP Patent Application No. 22209092.0 Rule 69 Communication dated May 10, 2023, 2 pages.

\* cited by examiner

METHODS AND APPARATUSES FOR TRANSMITTING AND RECEIVING SYNCHRONIZATION SIGNAL, AND TRANSMISSION SYSTEM

CROSS-REFERENCE TO RELATED APPLICATIONS

This patent document is a continuation of U.S. patent application Ser. No. 16/252,539, which is U.S. Pat. No. 11,102,737, filed Jan. 18, 2019, which is a continuation of and claims priority to International Patent Application No. PCT/CN2017/093393, filed on Jul. 18, 2017, which claims the priority of Chinese Patent Application No. 201610567463.5, filed on Jul. 18, 2016. The entire contents of the before-mentioned patent applications are incorporated by reference as part of the disclosure of this application.

TECHNICAL FIELD

The disclosure relates to the field of communications, and in particular to methods and apparatuses for transmitting and receiving a synchronization signal and a transmission system.

BACKGROUND

In the related technology, the new generation mobile communication system, i.e., new radio (NR) will be systematically networked on carrier frequencies higher than those used by 2G, 3G, and 4G systems. Currently, frequency bands that are widely recognized by the industry and identified by international organizations are mainly 3 GHz to 6 GHz, and 6 GHz to 100 GHz, which basically belong to centimeter bands and millimeter bands. Studies have shown that at frequencies between 6G and 100 GHz, especially higher frequencies, radio frequency devices have very serious phase noises, which can be resisted by increasing a subcarrier width of an Orthogonal Frequency Division Multiple Access system. High frequency bands and low frequency bands have a significant difference in terms of propagation characteristics. Since the propagation loss in the high frequency band is significantly larger than that in the low frequency band, the coverage of the high frequency band is generally much smaller than the coverage of the low frequency band, and the smaller coverage generally results in a smaller delay spread of a channel. The corresponding coherent bandwidth in the high frequency band is larger than the coherent bandwidth in the low frequency band of 300 MHz to 3000 MHz, and the subcarrier width, after being increased relative to that in the LTE system, can still satisfy the design requirement that the subcarrier spacing is within the coherent bandwidth. Therefore, a subcarrier spacing (SCS) (equivalent to the subcarrier width) needs to be adjusted according to a frequency level of the carrier, and it is feasible and reasonable to perform the adjustment.

The new generation wireless NR system covers the carrier frequencies from sub 6G up to 100G, and needs to use different subcarrier spacings and other basic frame structure parameters to adapt to the carrier frequencies. That is, the frame structure design parameter on each carrier frequency will be different from one another. For example, the closer the frequency is to the core frequency of LTE, the closer the subcarrier spacing and other typical frame structure parameters are to the existing parameters of LTE, and the higher the frequency is, the larger the subcarrier spacing is. At present, the subcarrier spacings under study may be 15 kHz, 30 kHz, 60 kHz, 75 kHz, 120 kHz, or up to 240 kHz, or may be less than 15 kHz.

In the related technology, not only the system may have different frame structure parameters on different frequencies, but subcarrier spacing parameters for different types of transmission services on a same carrier in the NR system may be different. For example, the ultrahigh reliable low delay communication (URLLC) service emphasizes low latency, and thus its corresponding symbol is shorter than that of enhanced Mobile Broadband (eMBB), and its subcarrier spacing is also larger than that of the eMBB. The mMTC service has demands of massive access and deep coverage, and thus its subcarrier spacing is much smaller than that of the eMBB service, and its symbol length is much larger than that of the eMBB. Multiple types of services are multiplexed on the same carrier, making the frame structure parameters of the system more complicated.

When the NR system has multiple frame structure parameters at different carrier frequencies or even at the same carrier frequency, if the signals of the synchronization signals of the system has too many options as the frame structure parameters, it will bring high complexity to initial synchronization access of a terminal. The terminal has to try different synchronization signals for multiple times without any preset information, resulting in that the detection takes a long time and the detection success rate is low.

It is apparent that too many options for the synchronization signals with different parameters in a system is unreasonable. The system needs a unified design, such that in the case of multiple carriers of different frequencies, or in the case of multiple frame structure parameters in the same carrier, the options for the synchronization signals to be accessed is limited to a reasonable range, thereby reducing the detection complexity, improving the detection success rate, and reducing the detection latency.

For the above problems in the related technology, no effective solution has been found yet.

SUMMARY

Embodiments of the disclosure provides methods and apparatuses for transmitting and receiving a synchronization signal, and a transmission system, so as to at least solve the problem of excessive complexity in detection of the synchronization signal in the related technology.

According to an embodiment of the disclosure, a method for transmitting a synchronization signal is provided, which includes that, a base station determines one or more sets of system parameters, each set of the system parameters including at least one of the following information of a carrier: frequency information, or a frame structure parameter; the base station constructs a synchronization signal of a predetermined structure according to the system parameters; and the base station transmits the synchronization signal to a terminal. The one or more sets of system parameters correspond to the same predetermined structure.

Optionally, the predetermined structure includes at least one of the following characteristics: a sequence identification, a sequence length, a mapping manner in which a sequence is mapped to a resource, a mapping manner in which a modulation symbol generated by the sequence is mapped to the resource, a time domain position of the synchronization signal, or a frequency domain position of the synchronization signal.

Optionally, the frame structure parameter includes at least one of a subcarrier spacing, a cyclic prefix (CP) type, or a CP length.

Optionally, the base station constructs a synchronization signal of a predetermined structure according to the system parameters includes that, the base station characterizes a time domain position and a frequency domain position by using a symbol number and a frequency domain subcarrier number respectively or using a physical resource position.

Optionally, the predetermined structure is classified into a first predetermined structure and a second predetermined structure. Each of the first predetermined structure and the second predetermined structure is associated with at least one of the following: configuration of a carrier frequency, supported service types, or a terminal capability.

Optionally, the frame structure parameter and the frequency information of the carrier have a one-to-one correspondence or a one-to-many correspondence.

Optionally, the correspondence is determined by one of the following manners:
  pre-definition;
  signaling indication; or
  obtaining by the terminal after performing blind detection on various frame structure parameters.

Optionally, the operation that the base station transmits the synchronization signal to the terminal includes that, the base station configures at least one of the following common channels or signals with part or all of the system parameters of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal, and transmits the configured common channel or signal to the terminal.

Optionally, when the system parameters used by the common channel or signal are different from the system parameters used by the synchronization signal, the system parameters of the synchronization signal used by the common channel or signal are indicated through the synchronization signal in an explicit or implicit manner.

Optionally, the response information of the response information of the response information of the random access is used to indicate one of the following information of terminals other than the terminal: dedicated data, a control channel, a control signal, or a control parameter.

According to an embodiment of the disclosure, a method for receiving a synchronization signal is provided, which includes that, a terminal acquires one or more sets of system parameters, each set of the system parameters including at least one of the following information of a carrier: frequency information, or a frame structure parameter; the terminal receives the synchronization signal as per a predetermined structure according to the system parameters. The one or more sets of system parameters correspond to the same predetermined structure.

Optionally, the predetermined structure includes at least one of the following characteristics: a sequence identification, a sequence length, a mapping manner in which a sequence is mapped to a resource, a mapping manner in which a modulation symbol generated by the sequence is mapped to the resource, a time domain position of the synchronization signal, or a frequency domain position of the synchronization signal.

Optionally, the frame structure parameter includes at least one of a subcarrier spacing, a cyclic prefix (CP) type, or a CP length.

Optionally, the operation that the terminal receives the synchronization signal as per a predetermined structure according to the system parameters includes that, the terminal receives the synchronization signal as per a first predetermined structure and when failing to receive and detect the synchronization signal, uses a second predetermined structure to receive the synchronization signal; or the terminal uses the second predetermined structure to receive the synchronization signal according to a terminal reception capability or a service type.

Optionally, the operation that the terminal acquires one or more sets of system parameters includes one of the following: the terminal acquires the one or more sets of system parameters through a mapping relationship between a pre-defined system parameter and a carrier frequency; the terminal acquires the one or more sets of system parameters through a mapping relationship between a system parameter indicated by signaling and the carrier frequency; or the terminal acquires the one or more sets of system parameters by performing blind detection on multiple sets of system parameters.

Optionally, the operation that the terminal acquires the synchronization signal as per a predetermined structure according to the system parameters includes that, the terminal characterizes a time domain position and a frequency domain position by using a symbol number and a frequency domain subcarrier number respectively, or the terminal characterizes the time domain position and the frequency domain position by directly using a physical resource, and receives the synchronization signal at the corresponding time domain position and frequency domain position.

Optionally, the operation that the terminal receives the synchronization signal includes that, the terminal receives at least one of the following common channels or signals with part or all of the system parameters which are as same as those of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal.

Optionally, when the system parameters used by the common channel or signal are different from the system parameters used by the synchronization signal, the terminal indicates the system parameters of the synchronization signal used by the common channel or the signal in an explicit or implicit manner through the synchronization signal.

According to another embodiments of the disclosure, an apparatus for transmitting a synchronization signal is provided, including: a determination module, arranged to determine one or more sets of system parameters, each set of the system parameters including at least one of the following information of a carrier: frequency information, or a frame structure parameter; a construction module, arranged to construct a synchronization signal of a predetermined structure according to the system parameters; and a transmission module, arranged to transmit the synchronization signal to the terminal. The one or more sets of system parameters correspond to the same predetermined structure.

Optionally, the predetermined structure includes at least one of the following characteristics: a sequence identification, a sequence length, a mapping manner in which a sequence is mapped to a resource, a mapping manner in which a modulation symbol generated by the sequence is mapped to the resource, a time domain position of the synchronization signal, or a frequency domain position of the synchronization signal.

Optionally, the frame structure parameter includes at least one of a subcarrier spacing, a cyclic prefix (CP) type, or a CP length.

Optionally, the construction module further includes: a construction unit, arranged to characterize the time domain position and the frequency domain position using a symbol number and a frequency domain subcarrier number respectively or using a physical resource position.

Optionally, the transmission module is further arranged to configure at least one of the following common channels or signals with part or all of the system parameters of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal, and transmit the configured common channel or signal to the terminal.

Optionally, when the system parameters used by the common channel or signal are different from the system parameters used by the synchronization signal, the system parameters of the synchronization signal used by the common channel or signal are indicated through the synchronization signal in an explicit or implicit manner.

Optionally, the predetermined structure includes a first predetermined structure and a second predetermined structure. Each of the first predetermined structure and the second predetermined structure is associated with at least one of the following: configuration of a carrier frequency, supported service types, or a terminal capability.

Optionally, the transmission module further includes: a first transmission unit, arranged to transmit the synchronization signal of the first predetermined structure to the terminal; a second transmission unit, arranged to transmit the synchronization signal of the first predetermined structure and the synchronization signal of the second predetermined structure to the terminal; and a third transmission unit, arranged to transmit the synchronization signal of the second predetermined structure to the terminal;

According to another embodiment of the disclosure, an apparatus for receiving a synchronization signal is provided, comprising: an acquisition module, arranged to acquire one or more sets of system parameters, each set of the system parameters including at least one of the following information of a carrier: frequency information, or a frame structure parameter; a reception module, arranged to receive the synchronization signal as per a predetermined structure according to the system parameters. The one or more sets of system parameters correspond to the same predetermined structure.

Optionally, the predetermined structure includes at least one of the following characteristics: a sequence identification, a sequence length, a mapping manner in which a sequence is mapped to a resource, a mapping manner in which a modulation symbol generated by the sequence is mapped to the resource, a time domain position of the synchronization signal, or a frequency domain position of the synchronization signal.

Optionally, the frame structure parameter includes at least one of a subcarrier spacing, a cyclic prefix (CP) type, or a CP length.

Optionally, the reception module is further arranged to: receive the synchronization signal as per a first predetermined structure according to the system parameters, and when failing to receive and detect the synchronization signal, use a second predetermined structure to receive the synchronization signal; or directly use the second predetermined structure to receive the synchronization signal according to capability of reception module.

Optionally, the acquisition module includes one of the following:
a first acquisition unit, arranged to acquire the one or more sets of system parameters through a mapping relationship between a predefined system parameter and a carrier frequency;
a second acquisition unit, arranged to acquire the one or more sets of system parameters through a mapping relationship between a system parameter indicated by signaling and the carrier frequency; and
a third acquisition unit, arranged to acquire the one or more sets of system parameters by performing blind detection on multiple sets of system parameters.

Optionally, the reception module is further arranged to characterize a time domain position and a frequency domain position by using a symbol number and a frequency domain subcarrier number respectively, or characterize the time domain position and the frequency domain position by directly using a physical resource, and receive the synchronization signal at the corresponding time domain position and frequency domain position.

Optionally, the reception module is arranged to receive at least one of the following common channels or signals with part or all of the system parameters which are as same as those of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal.

Optionally, when the system parameters used by the common channel or signal are different from the system parameters used by the synchronization signal, the terminal indicates the system parameters of the synchronization signal used by the common channel or the signal in an explicit or implicit manner through the synchronization signal.

According to another embodiment of the disclosure, a system for transmitting a synchronization signal is provided, including a base station and a terminal. The base station includes: a determination module, arranged to determine one or more sets of system parameters, each set of the system parameters including at least one of the following information of a carrier: frequency information, or a frame structure parameter; a construction module, arranged to construct a synchronization signal of a predetermined structure according to the system parameters; and a transmission module, arranged to transmit the synchronization signal to the terminal. The terminal includes: an acquisition module, arranged to acquire one or more sets of system parameters, each set of the system parameters including at least one of the following information of a carrier: frequency information, or a frame structure parameter; and a reception module, arranged to receive the synchronization signal as per a predetermined structure according to the system parameters. The one or more sets of system parameters correspond to the same predetermined structure.

According to another embodiment of the disclosure, a storage medium is provided. The storage medium is arranged to store a program code for performing the following steps:

The base station determines one or more sets of system parameters. Each set of system parameters includes at least one of a frequency information or a frame structure parameter.

The base station constructs a synchronization signal of a predetermined structure according to the system parameters.

The base station transmits a synchronization signal to the terminal, where one or more sets of system parameters correspond to the same predetermined structure.

According to the disclosure, the base station determines one or more sets of system parameters for characterizing at least one of frequency information or a frame structure parameter of a carrier, constructs a synchronization signal of a predetermined structure according to the system parameters, and transmits the synchronization signal to the terminal, the one or more sets of system parameters correspond to the same predetermined structure. Since the synchronization signal of the predetermined structure, when being constructed, is determined according to at least one of the frequency information or the frame structure parameter of the carrier, the synchronization signals of the carriers are designed uniformly. In the case of carriers of different frequencies, or in the case of multiple frame structure parameters in the same carrier, the options for the synchronization signal to be accessed is limited to a reasonable range, which can solve the problem of excessive complexity in synchronization signal detection in the related technology, achieves the effect of reducing the detection complexity, improving the detection success rate, and reducing the detection latency.

BRIEF DESCRIPTION OF DRAWINGS

The drawings are intended to provide further understanding of the subject matter described in the present disclosure, and the exemplary embodiments of the present disclosure and descriptions thereof are intended to illustrate the subject matter of the present disclosure, and are not meant to form improper limits to the subject matter of the present disclosure. In the drawings.

DETAILED DESCRIPTION

The subject matter will be described in detail below with reference to the drawings in conjunction with the embodiments. It should be noted that the embodiments and the features in the embodiments in the present disclosure may be combined with each other unless there is a conflict.

It should be noted that the terms "first", "second", and the like in the specification and claims of the present disclosure are used to distinguish similar objects, and are not necessarily used to describe a particular sequence or order.

Embodiment 1

Figure 1:
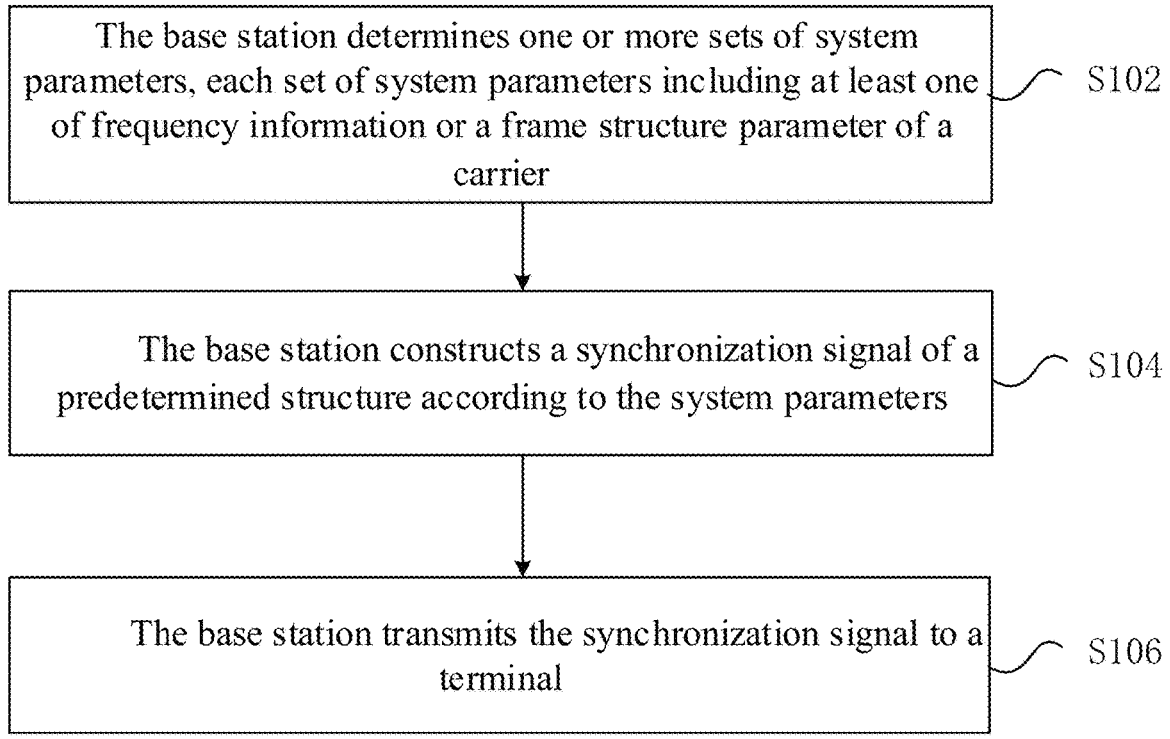
FIG. 1 is a flowchart of a method of transmitting a synchronization signal according to an embodiment of the present disclosure.

In this embodiment, a method for transmitting a synchronization signal is provided. FIG. 1 is a flowchart of a method for transmitting a synchronization signal according to an embodiment of the present disclosure. As shown in FIG. 1, the process includes the following steps.

In step S102, the base station determines one or more sets of system parameters. Each set of system parameters includes at least one of frequency information or a frame structure parameter of a carrier.

In step S104, the base station constructs a synchronization signal of a predetermined structure according to the system parameters.

In step S106, the base station transmits the synchronization signal to the terminal.

In this embodiment, the one or more sets of system parameters correspond to the same predetermined structure.

With the above steps, the base station determines one or more sets of system parameters for characterizing at least one of frequency information or a frame structure parameter of a carrier, constructs a synchronization signal of a predetermined structure according to the system parameters, and transmits the synchronization signal to the terminal, the one or more sets of system parameters correspond to the same predetermined structure. Since the synchronization signal of the predetermined structure, when being constructed, is determined according to at least one of the frequency information or the frame structure parameter of the carrier, different system parameters can be system parameters in different parameter type sets, or system parameters in a same parameters type set but having different value assignments for the parameter type. Even if each set of system parameters is different from one other or there are multiple possible sets, the structures of the corresponding synchronization signals can be consistent. This method uniformly designs the synchronization signals of the carriers. In the case of carriers of different frequencies, and/or in the case of multiple frame structure parameters in the same carrier, the options for the synchronization signal to be accessed is limited to a reasonable range, for example, corresponding to a single predetermined structure, which can solve the problem of excessive complexity in synchronization signal detection in the related technology, achieves the effect of reducing the detection complexity, improving the detection success rate, and reducing the detection latency.

Optionally, the execution body of the foregoing steps may be a network side device, such as a base station, a transmission node, a relay station, etc., but is not limited thereto. The carrier frequency in this embodiment is the frequency information of the carrier.

Optionally, the frame structure parameter includes at least one of the following: a subcarrier spacing, a cyclic prefix (CP) type, and a CP length. Optionally, the predetermined structure includes at least one of the following characteristics: a sequence identification, a sequence length, a mapping manner in which a sequence is mapped to a resource, a mapping manner in which a modulation symbol generated by the sequence is mapped to the resource, a time domain position of the synchronization signal, a frequency domain position of the synchronization signal, or etc. The advantage of the predetermined structure is that the constraints on the synchronization signal are based on a predefinition, which can effectively reduce the transmission and reception complexity of the synchronization signal.

Optionally, the predetermined structure may be classified into a logical structure and a physical structure. The time domain position and the frequency domain position of the synchronization signal in the logical structure are a logical time domain position and a logical frequency domain position respectively. The time domain position and the frequency domain position of the synchronization signal in the physical structure are a physical time domain position and a physical frequency domain position, respectively.

In an optional implementation of this embodiment, when the predetermined structure is a logical structure, the operation that the base station constructs the synchronization signal of the predetermined structure according to the system parameters includes that, the base station characterizes the logical time domain position and the logical frequency domain position using a symbol number and a frequency domain subcarrier number respectively, and maps the logical time domain position and the logical frequency domain position to a physical time domain position and a physical frequency domain position respectively. The frequency domain subcarrier is a smallest unit of the frequency domain resource, and multiple frequency domain subcarriers can be combined into a larger frequency domain resource unit. This larger frequency domain resource unit can also be used to characterize the frequency domain position.

When the predetermined structure is a physical structure, the operation that the base station constructs the synchronization signal of the predetermined structure according to the system parameters includes that, the base station constructs the synchronization signal by directly using the physical time domain position and the frequency domain position.

In an optional implementation according to this embodiment, when there are multiple sets of different system parameters, the operation that the base station constructs the synchronization signal of the predetermined structure according to the system parameters includes the following two methods.

The base station constructs a first synchronization signal of a same logic structure according to the multiple sets of different system parameters, and the multiple sets of different system parameters in the first synchronization signal have different physical structures; or
the base station constructs a second synchronization signal of a same physical structure according to the multiple sets of different system parameters, and the multiple sets of different system parameters in the second synchronization signal have different logical structures.

Optionally, the predetermined structure includes: a first predetermined structure and a second predetermined structure. The first predetermined structure and the second predetermined structure are all related to at least one of: configuration of a carrier frequency, supported service types, or a terminal capability.

The base station may transmit the synchronization signal of the first predetermined structure and the second predetermined structure, or may transmit merely the synchronization signal of the first predetermined structure or merely the synchronization signal of the second predetermined structure. The advantage is that coexistence of multiple service types may be flexibly embodied in the system.

Optionally, the one or more sets of system parameters correspond to the predetermined structure, and the frame structure parameters and the carrier frequencies have a one-to-one correspondence or a one-to-many correspondence.

Optionally, the correspondence is determined by one of the following manners: pre-definition; signaling indication; obtaining by the terminal after performing blind detection on multiple system parameters.

Optionally, the operation that the base station transmits the synchronization signal to the terminal includes that, the base station configures at least one of the following common channels or signals with part or all of the system parameters of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal, transmits the configured common channel or signal to the terminal. For example, the response information of the response information of the response information of the random access may be used to indicate one of the following information of terminals other than the current terminal: dedicated data, a control channel, a control signal, a control parameter. The advantage of this method is that the terminal does not need to try system parameters of other common channels or signals after acquiring the synchronization signal information, which effectively reduces the system complexity. The system parameters of the synchronization signal include at least the frame structure parameter used by the synchronization signal.

Optionally, when the system parameters used by the common channel or signal are different from the system parameters used by the synchronization signal, the terminal indicates the system parameters of the synchronization signal used by the common channel or the signal in an explicit or implicit manner through the synchronization signal.

Figure 2:
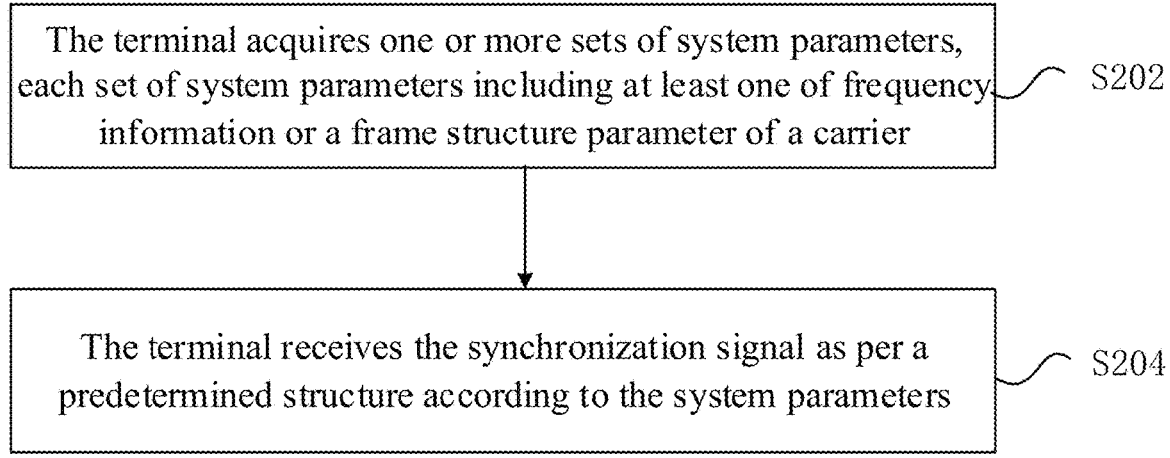
FIG. 2 is a flowchart of a method of receiving a synchronization signal according to an embodiment of the present disclosure.

In this embodiment, a method for receiving a synchronization signal is provided. FIG. 2 is a flowchart of a method for receiving a synchronization signal according to an embodiment of the present disclosure. As shown in FIG. 2, the process includes the following steps.

In Step S202, the terminal acquires one or more sets of system parameters, each set of system parameters including at least one of frequency information or a frame structure parameter of a carrier.

In Step S204, the terminal receives the synchronization signal as per a predetermined structure according to the system parameters.

In this embodiment, the one or more sets of system parameters correspond to the same predetermined structure.

Optionally, the predetermined structure includes one of the following characteristics: a sequence identifier, a sequence length, a mapping manner in which a sequence is mapped to a resource, a mapping manner in which a modulation symbol generated by the sequence is mapped to the resource, a time domain position of the synchronization signal, and a frequency domain position of the synchronization signal.

Optionally, the frame structure parameter includes at least one of the following: a subcarrier spacing, a cyclic prefix (CP) type, and a CP length.

Optionally, the operation that the terminal receiving the synchronization signal according to the predetermined parameter according to the system parameters includes the following actions.

In S11, the terminal receives the synchronization signal according to a first predetermined structure.

In S12, when the terminal does not receive the synchronization signal successfully, that is, when no synchronization signal is detected, the terminal uses a second predetermined structure to receive the synchronization signal.

Optionally, the terminal may receive the synchronization signal by directly using the second predetermined structure according to the capability or the service type.

Optionally, the operation that the terminal acquires the one or more sets of system parameters including the following implementations.

The terminal acquires the one or more sets of system parameters through a mapping relationship between a pre-defined system parameter and a carrier frequency;

the terminal acquires the one or more sets of system parameters through a mapping relationship between a system parameter indicated by the signaling and a carrier frequency; or the terminal acquires the one or more sets of system parameters by performing blind detection on multiple sets of system parameters.

In an optional implementation of the present embodiment, the operation that the terminal receives the synchronization signal of the predetermined structure according to the system parameters includes that, the terminal characterizes the time domain position and the frequency domain position by using the symbol number and the frequency domain subcarrier number respectively or characterizes the time domain position and the frequency domain position by directly using a physical resource, and receives synchronization signals at the corresponding time domain position and frequency domain position.

Optionally, the operations that the terminal receives the synchronization signal specifically includes that, the terminal receives at least one of the following common channels or signals with part or all of the system parameters which are as same as those of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal. When the system parameters used by the common channel or signal are different from the system parameters used by the synchronization signal, the terminal indicates the system parameters of the synchronization signal used by the common channel or the signal in an explicit or implicit manner through the synchronization signal. The system parameters of the synchronization signal at least include the frame structure parameter.

Through the description of the above embodiment, those skilled in the art can clearly understand that the methods according to the above embodiment can be implemented by means of software and a necessary general hardware platform, or of course, can be implemented through hardware, but in many cases the former is a better implementation. Based on such understanding, the essence of the technical solution of the present disclosure or the contributions to the prior art may be embodied in the form of a software product stored in a storage medium (such as ROM/RAM, magnetic disk, or optical disc), which includes instructions for causing a terminal device (which may be a cell phone, a computer, a server, or a network device, etc.) to perform the methods of various embodiments of the present disclosure.

Embodiment 2

In this embodiment, a synchronization signal transmission apparatus for transmitting a synchronization signal, an apparatus for receiving a synchronization signal, and a transmission system for the synchronization signal are provided. The apparatuses are used to implement the above-described embodiments and preferred embodiments, and the description thereof has been omitted. As used below, the term "module" may implement a combination of software and/or hardware of a predetermined function. Although the devices described in the following embodiments are preferably implemented by software, the implementation by hardware or a combination of software and hardware is also possible and contemplated.

Figure 3:
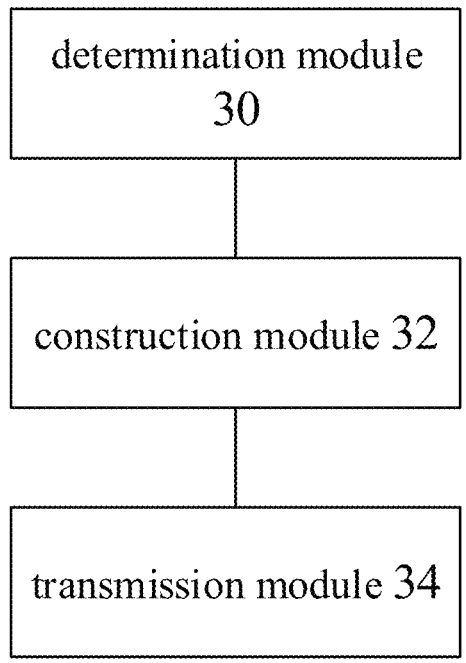
FIG. 3 is a block diagram showing the structure of an apparatus for transmitting a synchronization signal according to an embodiment of the present disclosure.

FIG. 3 is a block diagram showing a structure of a device for transmitting a synchronization signal according to an embodiment of the present disclosure. As shown in FIG. 3, the device includes a determination module 30, a construction module 32 and a transmission module 34.

The determination module 30 is arranged to determine one or more sets of system parameters, each set of system parameters includes at least one of frequency information or a frame structure parameter.

The construction module 32 is arranged to construct a synchronization signal of a predetermined structure according to system parameters.

The transmission module 34 is arranged to transmit the synchronization signal to the terminal.

In this embodiment, the one or more sets of system parameters correspond to the same predetermined structure.

Optionally, the predetermined structure includes one of the following characteristics: a sequence identifier, a sequence length, a mapping manner in which a sequence is mapped to a resource, a mapping manner in which a modulation symbol generated by the sequence is mapped to the resource, a time domain position of the synchronization signal, and a frequency domain position of the synchronization signal. The frame structure parameter includes at least one of the following: a subcarrier spacing, a cyclic prefix (CP) type, and a CP length.

Optionally, the construction module further includes a construction unit, arranged to characterize the logical time domain position and the logical frequency domain position using a symbol number and a frequency domain subcarrier number respectively. The frequency domain subcarrier is a smallest unit of the frequency domain resource, and multiple frequency domain subcarriers can be combined into a larger frequency domain resource unit. This larger frequency domain resource unit can also be used to characterize the frequency domain position.

Optionally, the transmission modules is further arranged to configure at least one of the following common channels or signals with system parameters of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal, transmit the configured common channel or signal to the terminal. When the system parameters used by the common channel or signal are different from the system parameters used by the synchronization signal, the system parameters of the synchronization signal used by the common channel or the signal are indicated in an explicit or implicit manner through the synchronization signal.

Figure 4:
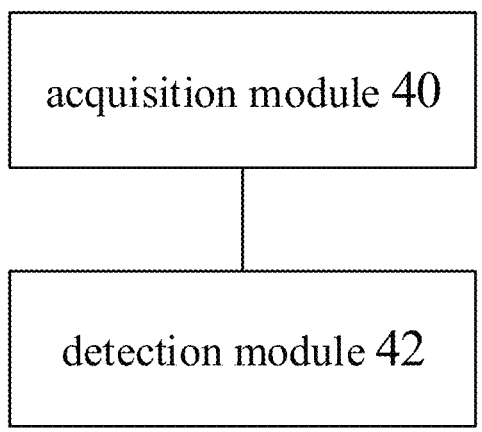
FIG. 4 is a block diagram showing the structure of an apparatus for receiving a synchronization signal according to an embodiment of the present disclosure.

FIG. 4 is a block diagram showing a structure of an apparatus for receiving a synchronization signal according to an embodiment of the present disclosure. As shown in FIG. 4, the method includes an acquisition module 40 and a detection module 42.

The acquisition module 40 is arranged to acquire one or more sets of system parameters. Each set of the system parameters includes at least one of frequency information or a frame structure parameter.

The detection module 42 is arranged to receive the synchronization signal according to the predetermined configuration according to the system parameters by the terminal.

In this embodiment, the one or more sets of system parameters correspond to the same predetermined structure.

Optionally, the predetermined structure includes at least one of the following characteristics: a sequence identifier, a sequence length, a mapping manner in which a sequence is mapped to a resource, a mapping manner in which a modulation symbol generated by the sequence is mapped to the resource, a time domain position of the synchronization signal, and a frequency domain position of the synchronization signal.

Optionally, the frame structure parameter includes at least one of the following: a subcarrier spacing, a cyclic prefix (CP) type, and a CP length.

Optionally, a reception module is arranged to receive the synchronization signal according to a first predetermined structure; when the synchronization signal is not received successfully, use a second predetermined structure to receive the synchronization signal.

Optionally, the reception module is further arranged to receive the synchronization signal by directly using the second predetermined structure according to the capability or the service type.

Optionally, the acquisition modules further includes at least one of the following units: a first acquisition unit, arranged to acquire the one or more sets of system parameters through a mapping relationship between a predefined system parameter and a carrier frequency; a second acquisition unit, arranged to acquire the one or more sets of system parameters through a mapping relationship between a system parameter indicated by the signaling and a carrier frequency; or a third acquisition unit, arranged to acquire the one or more sets of system parameters by performing blind detection on the multiple sets of system parameters.

Optionally, the reception module is further arranged to characterize the time domain position and the frequency domain position by using the symbol number and the frequency domain subcarrier number respectively or by directly using a physical resource, and receive synchronization signals at the corresponding time domain position and frequency domain position. The frequency domain subcarrier is a smallest unit of the frequency domain resource, and multiple frequency domain subcarriers can be combined into a larger frequency domain resource unit. This larger frequency domain resource unit can also be used to characterize the frequency domain position.

Optionally, the reception module is further arranged to receive at least one of the following common channels or signals with the system parameters which are as same as those of the synchronization signal: broadcast information, common reference signal for reference signal received power (RSRP) measurement and beam calibration, response information of an access request, random access response information, response information of response information of the response information of the access request, response information of response information of response information of the random access, an uplink random access signal, an access request signal, response information of response information of the access request signal, or response information of response information of the uplink random access signal.

Optionally, when the system parameters used by the common channel or signal are different from the system parameters used by the synchronization signal, the terminal indicates the system parameters of the synchronization signal used by the common channel or the signal in an explicit or implicit manner through the synchronization signal.

Figure 5:
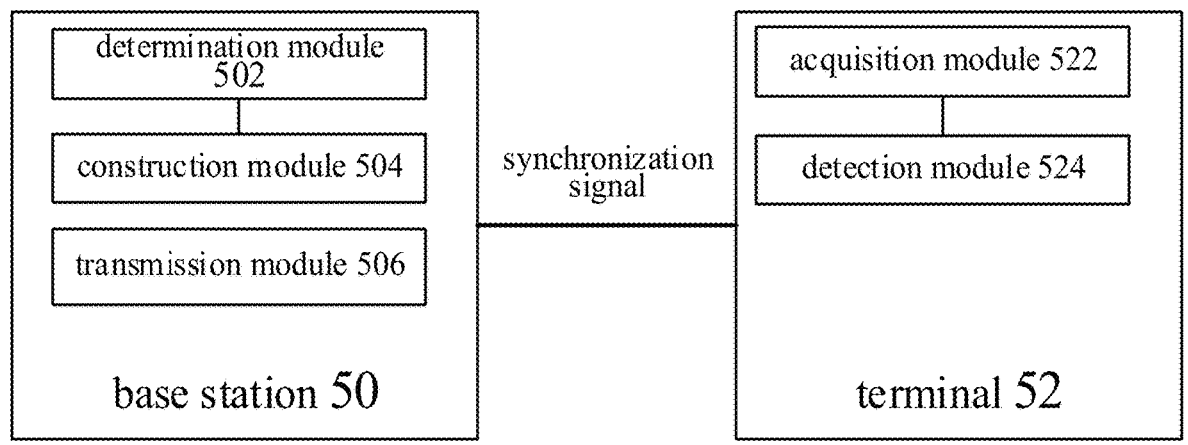
FIG. 5 is a block diagram showing the structure of a transmission system for a synchronization signal according to an embodiment of the present disclosure.

FIG. 5 is a block diagram showing a structure of a transmission system for a synchronization signal according to an embodiment of the present disclosure. As shown in FIG. 5, the transmission system includes a base station 50 and a terminal 52. The base station 50 includes determination module 502, a construction module 504 and a transmission module 506.

The determination module 502 is arranged to determine one or more sets of system parameters, each set of system parameters includes at least one of frequency information or a frame structure parameter of a carrier used by signal transmission between the base station and the terminal.

The construction module 504 is arranged to construct a synchronization signal of a predetermined structure according to system parameters.

The transmission module 506 is arranged to transmit the synchronization signal to the terminal.

The terminal 52 includes an acquisition module 522 and a detection module 524.

The acquisition module 522 is arranged to acquire one or more sets of system parameters. Each set of the system parameters includes at least one of frequency information or a frame structure parameter for characterizing the carrier.

The detection module 524 is arranged to receive the synchronization signal according to the predetermined configuration according to the system parameters by the terminal.

In this embodiment, one or more sets of system parameters correspond to the same predetermined structure.

It should be noted that each of the foregoing modules may be implemented by software or hardware. For the latter, the foregoing modules may be, but not limited to, implemented in the following manner: the foregoing modules are all located in the same processor; or, the foregoing modules are located in different processors in any combination.

Embodiment 3

This embodiment is an embodiment according to the present disclosure for explaining the subject matter in detail.

This embodiment provides a method and an apparatus for transmitting a synchronization signal, which are used to solve the problems of synchronization detection and access in the NR system.

Simply limiting the size of the system parameter set of the synchronization signal itself can meet the requirement of reducing the complexity. However, in the actual system, due to the different carrier frequencies, the demand of different system parameters for the synchronization signal indeed exists. Therefore, the options of the parameters for the synchronization signal cannot be simply limited.

One possible way is to decouple the design of the system parameters of the synchronization signal and the structure of the synchronization signal as much as possible to allow the various system parameters of the synchronization signals existing in the NR system to be mapped onto a basic structure of the synchronization signal or mapped to a very small number of special structures of the synchronization signal. Thus only the basic structure of synchronization signal or the special structures of the synchronization signal have to be detected.

That is, even if the synchronization signals have different system parameters, the corresponding structure of the synchronization signals can be consistent, thereby reducing the complexity in the detection process, achieving the purpose of ensuring the detection accuracy and reducing the detection latency.

This embodiment includes the following two specific embodiments.

Specific Embodiment 1: Mapping Relationship Between System Parameters and Physical Structures of Synchronization Signals In the NR system, carriers of different frequencies have different frame structure parameters, and frame structure parameters are an important type of system parameters. If the NR system still employs the typical orthogonal frequency division multiple access technology or a varied multiple access technology of the orthogonal frequency division multiple access, the important parameters of frame structure parameters of the NR system are subcarrier spacing (SCS), symbol length, type and length of prefix CP, sampling frequency, points of Fast Fourier Transformation (FFT) etc., in which the subcarrier spacing is a core parameter, and the reciprocal of the subcarrier spacing is the symbol length (useful data portion, without prefix).

Figure 6:
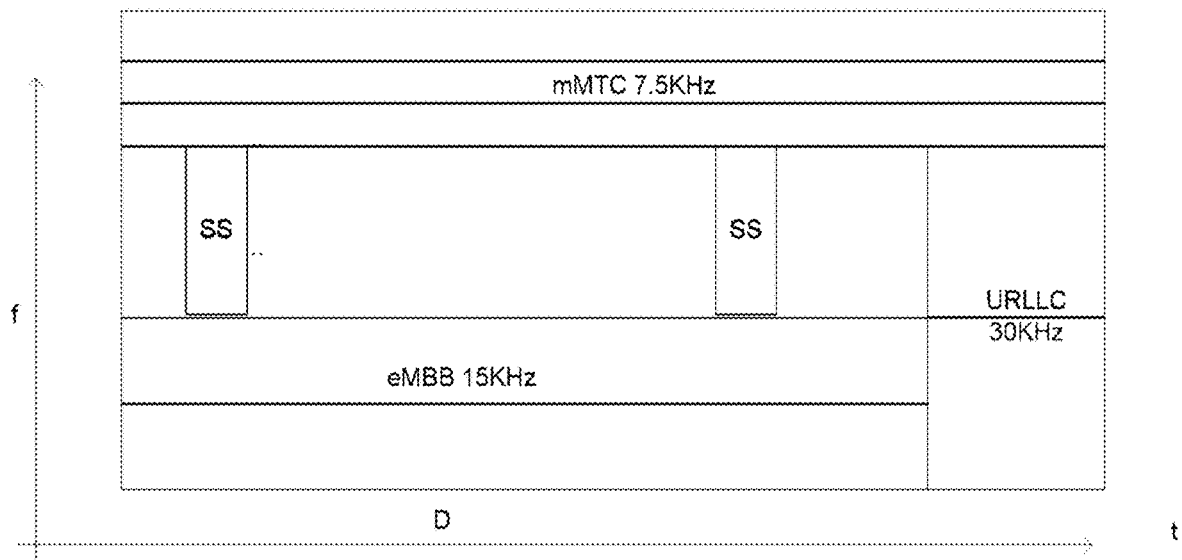
FIG. 6 is a schematic diagram showing transmission of a downlink service and a downlink synchronization signal according to an embodiment of the present disclosure.

There are different types of services in the same carrier, and different frame structure parameters are provided for different service characteristics. For example, services such as Ultra Reliable Low Latency Communication (URLLC), Enhanced Mobile Broadband (eMBB) or Massive Machine Type Communication (mMTC), or the like that have different frame structure parameters may be multiplexed on a certain carrier. The URLLC service has a small symbol length and a large subcarrier spacing, while the mMTC service has a large symbol length and a small subcarrier spacing. FIG. 6 is a schematic diagram showing transmission of downlink traffic and downlink synchronization signals according to an embodiment of the present disclosure. The URLLC, eMBB, and mMTC services use subcarrier spacings of 30 KHz, 15 KHz and 7.5 KHz respectively and use the time-frequency resources of the NR system in the manner of FDM and TDM multiplexing. SS represents the synchronization signal. The system parameters of the SS are based on the subcarriers of the eMBB service, and also uses the subcarrier spacing of 15 KHz. The practical solution is not limited to the illustrated manner.

The system parameters of the synchronization signal include the above-mentioned frame structure parameters such as subcarrier spacing (SCS), symbol length, type and length of the prefix CP. The system parameters of the synchronization signal also include the frequency information of the carrier.

The structure of the synchronization signal is a description of construction of a sequence of synchronization signals, a resource usage manner, and a resource mapping manner. Specifically, the sequence design in the structure needs to consider the sequence type, sequence length, sequence identity, etc. The resource usage manner in the structure needs design of position of the logical or physical time-frequency resource used by the synchronization signal. The resource mapping manner in the structure needs design of a mapping manner in which the modulation symbols of the sequence of synchronization signals is mapped to the foregoing time-frequency resource, such as a center mapping, a continuous low-to-high mapping, and a comb-like mapping.

When the terminal performs detection of reception of the synchronization signal, if the structure of the synchronization signal is uncertain, the main problem is that the terminal firstly has to find the time-frequency domain position of the synchronization signal, and has to determine the sequence identification, the possible length, a mapping manner in which sequence modulation symbols are mapped to logic and manner of physical resources, and other characteristics of the synchronization signal. Predetermined constraints on these characteristics can effectively reduce uncertainty and reduce the complexity of system transmission and terminal reception.

Considering that the frame structure parameter of NR is very likely to adopt a scalable manner, e.g., scalable expansions to the LTE reference subcarrier spacing, e.g., SCS=15 KHz, by integer multiples M, such as 15 KHz, 30 KHz, 60 KHz, 75 KHz, 120 KHz, 240 KHz, and etc.

Therefore, in the specific design of the synchronization signal, if the resources formed by the symbol position number and the frequency domain subcarrier position number are described as logical resources, then a same set of logic resources formed by unified symbol position numbers and frequency domain subcarrier position numbers can be used to be mapped to physical resources of different shapes under different subcarrier spacing parameters. Further, considering the sequence length and the mapping manner in which the modulation symbol is mapped to the logical resource, the same set of sequence design, such as sequence identification, sequence length, mapping manner of the sequence modulation symbol, etc., can be firstly mapped to logical resources, and then mapped to physical resources of different shapes under different subcarrier spacing parameters. In the NR system, the synchronization signal may have diversified system parameters, briefly speaking, various types of system parameters of the synchronization signal may correspond to a structure of the synchronization signal, and the absolute shapes of the physical resources under the same structure may be the same or different.

Figure 7:
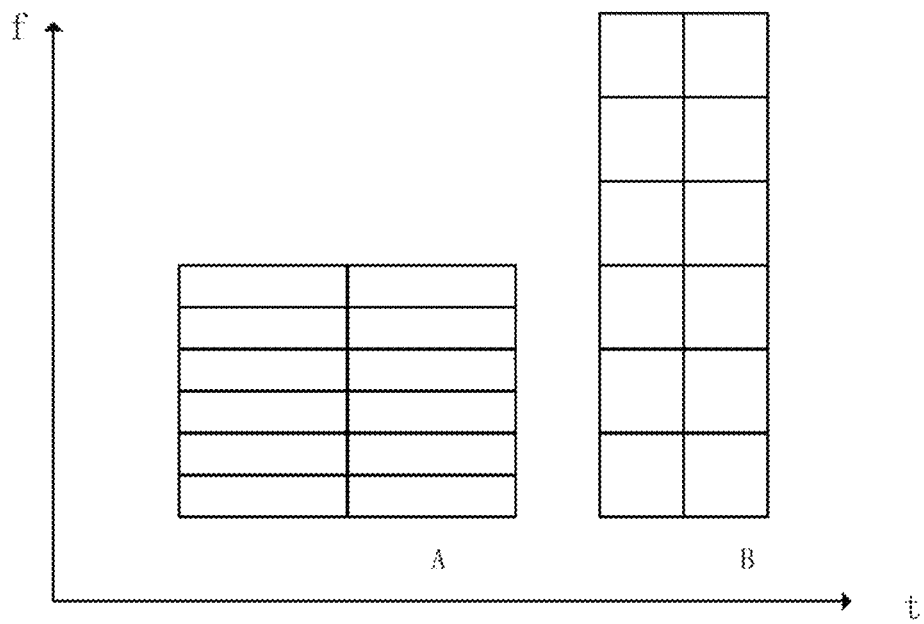
FIG. 7 is a schematic diagram showing mapping of a same logical resource to physical resources of different shapes according to an embodiment of the present disclosure.

FIG. 7 is a schematic diagram showing mapping of a same logical resource to physical resources of different shapes according to an embodiment of the present disclosure. FIG. 7 depicts that unified symbol position numbers and frequency domain subcarrier position numbers are used to be firstly mapped to logical resources, and then to physical resources of different shapes under different subcarrier spacing parameters. A and B are structures of two synchronizing signals having different shapes. However, since the parameters adopt a scalable manner, the actual areas of A and B are the same, that is, the time-frequency resource consumptions are the same. Both A and B are described using two symbols and six subcarriers. The frequency domain subcarrier is the smallest unit of the frequency domain resource, and multiple frequency domain subcarriers can be combined into a larger frequency domain resource unit. This larger frequency domain resource unit can also be used to represent the frequency domain position.

The above solution represents different physical resources with a same logical resource, and finally achieve the purpose of corresponding the multiple system parameters of synchronization signals to a same structure.

Figure 8:
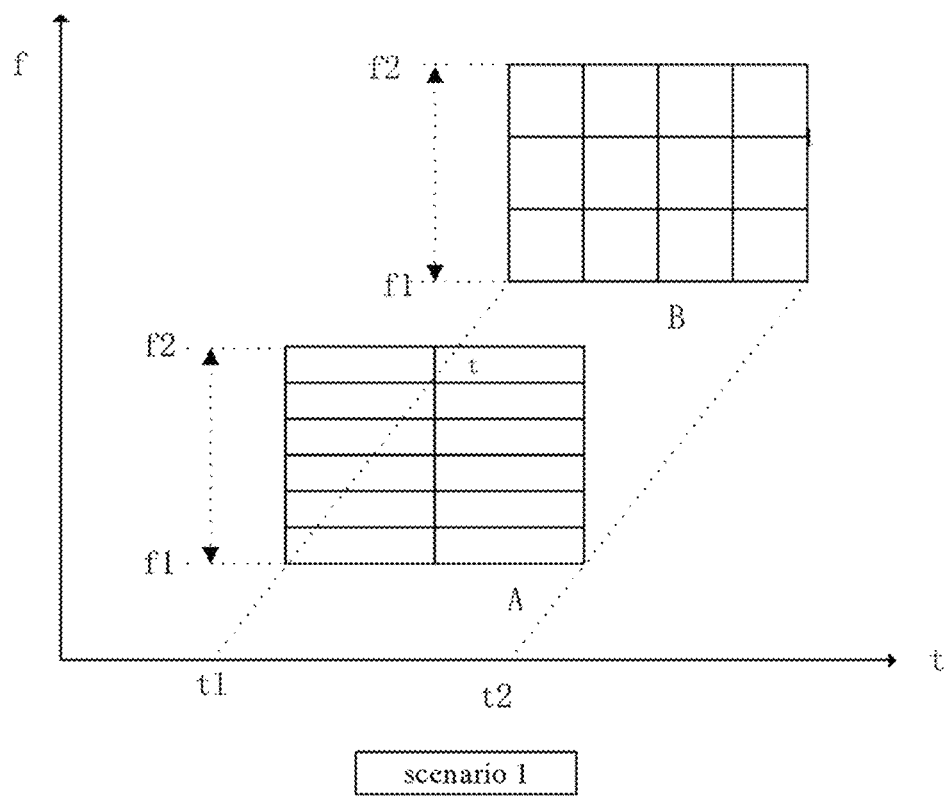
FIG. 8 is a schematic diagram showing mapping of different logical resources to a physical resource of a same shape according to an embodiment of the present disclosure.
Figure 8:
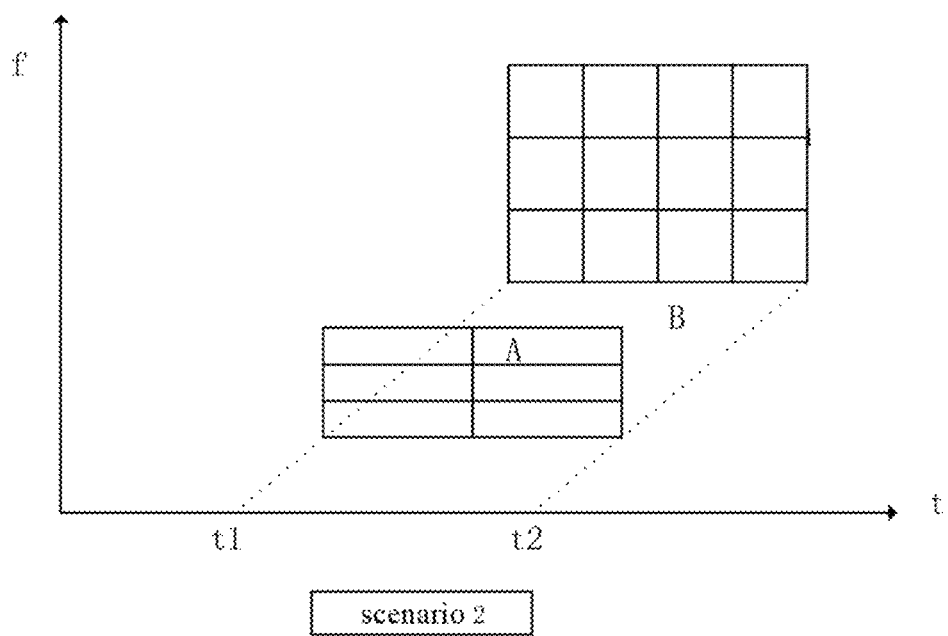

Another solution is to keep the absolute shape of the physical resources unchanged, and meanwhile, the manner of mapping to related logical resources is to be adjusted. FIG. 8 is a schematic diagram showing mapping of different logical resources to a physical resource of a same shape according to an embodiment of the present disclosure, including two scenarios. In scenario 1 of FIG. 8, the physical resources A and B are of a same shape, but have different basic parameters, e.g., subcarrier spacings. The subcarrier spacing of A is a half of that of B, and the symbol length of A is equal to the symbol length of B. The logical resource of A is 2 symbols and 6 subcarriers, and the logical resource of B is 4 symbols and 3 subcarriers. This is also a way in which multiple system parameters of synchronization signals can correspond to a same structure.

In scenario 2 of FIG. 8, as a variant of scenario 1, some dimension(s) of the physical resource, such as the time resource, remains unchanged, while changes of the frequency resource is not limited. That is, the multiple system parameters of the synchronization signals can correspond to the structure with a constant physical time resource. For example, the structure of the synchronization signal corresponding to the system parameter of the 15 KHz subcarrier spacing and that corresponding to the system parameter of the 30 KHz subcarrier spacing may occupy the same physical time resource, or the structure of the synchronization signal corresponding to the system parameter of the 120 KHz subcarrier spacing and that corresponding to the system parameter of the 240 KHz subcarrier spacing may occupy the same physical time resource.

The NR system at least needs to determine one basic structure for the synchronization signal. In addition, there may be other optional structures for synchronization signal. For example, for special mMTC services, the subcarrier spacing is very short, and the time length of the basic resource is very long, and thus it is necessary to design a structure of the synchronization signal particularly for the mMTC service. The basic and optional structures of the synchronization signal is related to the configuration of the carrier frequency, supported service types, and the terminal capability. There may be multiple structures in the system for different types of terminals to perform reception detection. The terminal firstly performs reception detection on the synchronization signal according to the basic structure of the synchronization signal. If the reception detection is not successful, another optional structure of the synchronization signal is tried. Or the terminal is a single mMTC service terminal, and the optional structures of the synchronization signal belonging to the mMTC service may be directly used to perform the detection.

Generally speaking, the basic structure of the synchronization signal may be referred to as a first predetermined structure, and an optional structure of the synchronization signal may be referred to as a second predetermined structure. The first and second predetermined structures may appear in the same system, or only the first predetermined structure may appear in one system or only the second predetermined structure may appear in one system. Therefore, the "basic" and "optional" mentioned here does not mean that the "optional" must be based on the "basic". The two are parallel and not mutually premised.

Specific Embodiment 2: Selection and Detection of System Parameters of Synchronization Signal The system parameters of the synchronization signal within the carrier may be the same as the parameters of a certain service (URLLC, eMBB or mMTC) on this carrier, or may be completely different. Considering that the NR system in the future is still dominated by the eMBB service, the system parameters, e.g., the subcarrier spacings, of the synchronization signal may be the same as the subcarrier spacing parameters of the eMBB service in the same carrier. In a special design, the system parameters of the synchronization signal may be different from the parameters of all services in the carrier.

There is a one-to-one or one-to-many correspondence between the system parameters of the synchronization signals and the carrier frequencies. The carrier frequency of a certain frequency band may have only one type of system parameters of the synchronization signal, or multiple frequency bands may share only one type of system parameters of the synchronization signal. The system parameters of the synchronization signal used by the system have to be known by the terminal to be detected. The terminal can learn the parameters used in the detection by the mapping relationship between the predefined system parameters and the carrier frequencies; or indicate the mapping relationship through signaling, and the signaling can be obtained through other carriers and other system-assisted methods, for example, the information of the system parameters of the NR can be acquired through the LTE system that is already accessed; or the terminal acquires accurate parameter information after blind detection of several possible types of system parameters of the synchronization signal.

The system parameters of the synchronization signal can be similarly configured to other common channels and signals, such as broadcast information, common reference signal for RSRP measurement and beam calibration, response information of an access request, random access response information, response information of response information of the response information of the access request, response information of response information of response information of the random access, an uplink random access signal, an access request signal, response information of response information of the access request signal. The advantage of this operation is that the terminal does not need further search to confirm the system parameters of other common channels and signals after acquiring the synchronization information, thereby saving the implementation complexity of the terminal.

Figure 9:
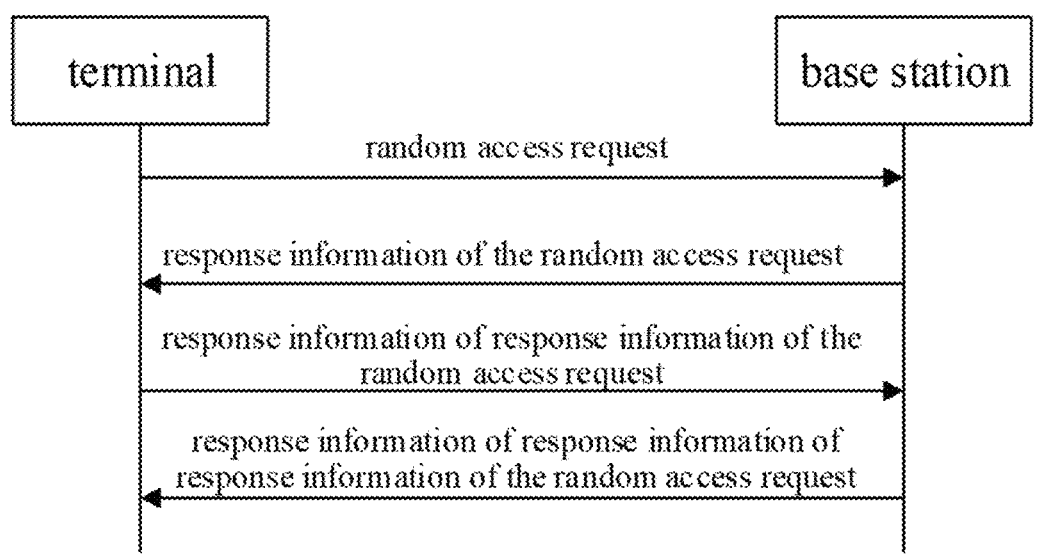
FIG. 9 is a schematic diagram showing interaction of response information according to an embodiment of the present disclosure.

FIG. 9 is a schematic diagram showing interaction of response information according to an embodiment of the present disclosure. As shown in FIG. 9, the definitions of response information of random access, response information of response information of random access, and response information of response information of response information of random access are shown in FIG. 9.

If the above channels and signals do not use the same parameters as those of the synchronization signal, the system parameters of the above signals and channels may be indicated in an explicit or implicit manner through the synchronization signal. By means of the indication, it is also possible to prevent the terminal from performing further blind detection of system parameters of the common channels and the signals.

Parameters of other-terminal-specific data or control channels or signals may be indicated by response information of response information of response information of the random access.

Embodiment 4

Embodiments of the present disclosure also provide a storage medium. Optionally, in the embodiment, the storage medium may be arranged to store a program code for performing the following steps:
 S1. The base station determines one or more sets of system parameters. Each set of system parameters includes at least one of the following information of a carrier: frequency information or a frame structure parameter.
 S2. The base station constructs a synchronization signal of a predetermined structure according to the system parameters.
 S3. The base station transmits the synchronization signal to the terminal, where one or more sets of the system parameters correspond to the same predetermined structure.

Optionally, in this embodiment, the storage medium may include, but is not limited to, various media such as a USB drive, a Read-Only Memory (ROM), a Random Access Memory (RAM), a mobile hard disk, and a magnetic disk or an optic disc, that can store the program code.

Optionally, in this embodiment, the processor executes program codes stored in the storage medium to determine one or more sets of system parameters, each set of the system parameters includes at least one of the following information of a carrier: frequency information, or a frame structure parameter.

Optionally, in this embodiment, the processor executes the program code stored in the storage medium to cause the base station to construct a synchronization signal of a predetermined structure according to the system parameters.

Optionally, in this embodiment, the processor transmits a synchronization signal to the terminal according to the program code stored in the storage medium. One or more sets of system parameters correspond to the same predetermined structure.

Optionally, the specific examples in this embodiment may refer to the examples described in the foregoing embodiments and the optional embodiments, and details are not described herein again.

It will be apparent to those skilled in the art that the various modules or steps of the present disclosure described above can be implemented by a general-purpose computing device, which can be centralized on a single computing device or distributed across a network of multiple computing devices. Alternatively, they may be implemented by program codes executable by the computing device such that they may be stored in the storage device to be executed by the computing device and, in some cases, may be different from the order illustrated or described herein. The steps shown or described are performed or fabricated separately into individual integrated circuit modules, or a plurality of modules or steps thereof are fabricated as a single integrated circuit module. Thus, the disclosure is not limited to any specific combination of hardware and software.

The above description is only the preferred embodiment of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

INDUSTRIAL APPLICABILITY

As described above, the method and apparatus for transmitting and receiving a synchronization signal and the transmission system provided by this embodiments have the following beneficial effects: since the synchronization signal of the predetermined structure, when being constructed, is determined according to at least one of the frequency information or the frame structure parameter of the carrier, the synchronization signals of the carriers are designed uniformly. In the case of carriers of different frequencies, or in the case of multiple frame structure parameters in the same carrier, the options for the synchronization signal to be accessed is limited to a reasonable range, which can solve the problem of excessive complexity in synchronization signal detection in the related technology, achieves the effect of reducing the detection complexity, improving the detection success rate, and reducing the detection latency.

The invention claimed is:
1. A method for transmitting a synchronization signal, comprising:
 determining, by a base station, a plurality of sets of system parameters, wherein each set of the system parameters comprises frequency information of a carrier and a frame structure parameter,
  wherein, for each set of system parameters, frequency information of the carrier has a predefined correspondence with a frame structure parameter;

constructing, by the base station, the synchronization signal of a structure from a first predetermined structure or a second predetermined structure, wherein the structure is according to a set of system parameters from the plurality of sets of system parameters, wherein the first predetermined structure and the second predetermined structure have a same time domain position, wherein a time domain position of the first predetermined structure and the second predetermined structure is the same for different frame structure parameters, and wherein system parameters of common channels and common signals are same as the set of system parameters that are used to construct the synchronization signal; and transmitting, by the base station, the synchronization signal to a terminal.

2. The method of claim 1, wherein the first predetermined structure and the second predetermined structure comprises the time domain position and a frequency domain position.

3. The method of claim 1, wherein the frame structure parameter comprises a subcarrier spacing.

4. The method of claim 3, wherein the base station transmits the synchronization signal to the terminal, comprising:

configuring, by the base station, a common channel using the subcarrier spacing of the set of system parameters that are used to construct the synchronization signal, wherein the common channel comprises broadcast information;

transmitting, by the base station, the configured common channel to the terminal.

5. The method of claim 4, wherein the subcarrier spacing used by the common channel is indicated through the synchronization signal in an explicit manner.

6. The method of claim 1, wherein the base station characterizes a time domain position of the synchronization signal by using a symbol number and characterizes a frequency domain position of the synchronization signal by using a physical resource position.

7. A method for receiving a synchronization signal, comprising:

obtaining, by a terminal, a plurality of sets of system parameters, wherein each set of the system parameters comprises frequency information of a carrier and a frame structure parameter, wherein, for each set of system parameters, frequency information of the carrier has a predefined correspondence with a frame structure parameter; and receiving, by the terminal, the synchronization signal of a structure from a first predetermined structure or a second predetermined structure, wherein the structure is according to a set of system parameters from the plurality of sets of system parameters, wherein the first predetermined structure and the second predetermined structure have a same time domain position, wherein a time domain position of the first predetermined structure and the second predetermined structure is the same for different frame structure parameters, and wherein system parameters of common channels and common signals are same as the set of system parameters that are used to construct the synchronization signal.

8. The method of claim 7, wherein the first predetermined structure and the second predetermined structure comprises the time domain position and a frequency domain position.

9. The method of claim 7, wherein the frame structure parameter comprises a subcarrier spacing.

10. The method of claim 9, wherein the receiving, by the terminal, the synchronization signal of the first predetermined structure or the synchronization signal of the second predetermined structure according to the plurality of sets of system parameters comprises:

receiving a common channel configured by using the subcarrier spacing of the set of system parameters that are used to construct the synchronization signal, wherein the common channel comprises broadcast information.

11. The method of claim 10, wherein the subcarrier spacing used by the common channel is received through the synchronization signal in an explicit manner.

12. The method of claim 7, wherein a time domain position of the synchronization signal is characterized by using a symbol number and a frequency domain position of the synchronization signal is characterized by using a physical resource position.

13. A base station, comprising a processor configured to:

determine a plurality of sets of system parameters, wherein each set of the system parameters comprises frequency information of a carrier and a frame structure parameter, wherein, for each set of system parameters, frequency information of the carrier has a predefined correspondence with a frame structure parameter;

construct a synchronization signal of a structure from a first predetermined structure or a second predetermined structure, wherein the structure is according to a set of system parameters from the plurality of sets of system parameters, wherein the first predetermined structure and the second predetermined structure have a same time domain position, wherein a time domain position of the first predetermined structure and the second predetermined structure is the same for different frame structure parameters, and wherein system parameters of common channels and common signals are same as the set of system parameters that are used to construct the synchronization signal; and transmit the synchronization signal to a terminal.

14. The base station of claim 13, wherein the first predetermined structure and the second predetermined structure comprises the time domain position and a frequency domain position.

15. The base station of claim 13, wherein the frame structure parameter comprises a subcarrier spacing.

16. The base station of claim 13, wherein the processor of the base station is configured to characterize a time domain position of the synchronization signal by using a symbol number and characterizes a frequency domain position of the synchronization signal by using a physical resource position.

17. A terminal, comprising a processor configured to:
obtain a plurality of sets of system parameters, wherein each set of the system parameters comprises frequency information of a carrier and a frame structure parameter,
 wherein, for each set of system parameters, frequency information of the carrier has a predefined correspondence with a frame structure parameter; and
receive a synchronization signal of a structure from a first predetermined structure or a second predetermined structure,
 wherein the structure is according to a set of system parameters from the plurality of sets of system parameters,
 wherein the first predetermined structure and the second predetermined structure have a same time domain position,
 wherein a time domain position of the first predetermined structure and the second predetermined structure is the same for different frame structure parameters, and
 wherein system parameters of common channels and common signals are same as the set of system parameters that are used to construct the synchronization signal.

18. The terminal of claim 17, wherein the first predetermined structure and the second predetermined structure comprises the time domain position and a frequency domain position.

19. The terminal of claim 17, wherein the frame structure parameter comprises a subcarrier spacing.

20. The terminal of claim 17, wherein a time domain position of the synchronization signal is characterized by using a symbol number and a frequency domain position of the synchronization signal is characterized by using a physical resource position.

* * * * *